United States Patent
Schreiner et al.

(10) Patent No.: US 10,352,555 B2
(45) Date of Patent: Jul. 16, 2019

(54) LOW-NO$_x$-BURNER

(71) Applicant: LINDE AKTIENGESELLSCHAFT, München (DE)

(72) Inventors: Bernhard Schreiner, Oberhaching (DE); Lennart Rangmark, Älvsjö (SE); Tomas Ekman, Saltsjö-Boo (SE); Ambrogio Gusberti, Milan (IT)

(73) Assignee: Linde Aktiengesellschaft, Munich (DE)

( * ) Notice: Subject to any disclaimer, the term of this patent is extended or adjusted under 35 U.S.C. 154(b) by 61 days.

(21) Appl. No.: 15/505,783

(22) PCT Filed: Aug. 11, 2015

(86) PCT No.: PCT/EP2015/001656
§ 371 (c)(1),
(2) Date: Feb. 22, 2017

(87) PCT Pub. No.: WO2016/034263
PCT Pub. Date: Mar. 10, 2016

(65) Prior Publication Data
US 2017/0276344 A1    Sep. 28, 2017

(30) Foreign Application Priority Data

Sep. 2, 2014 (EP) ................................. 14003024

(51) Int. Cl.
*F23D 14/22* (2006.01)
*F23C 6/04* (2006.01)
*F23L 7/00* (2006.01)

(52) U.S. Cl.
CPC .............. *F23C 6/045* (2013.01); *F23D 14/22* (2013.01); *F23L 7/007* (2013.01); *F23C 2201/301* (2013.01); *F23L 2900/07005* (2013.01); *Y02E 20/344* (2013.01)

(58) Field of Classification Search
CPC ..................................... F23C 1/00; F23C 7/00
USPC ............................................................ 431/9
See application file for complete search history.

(56) References Cited

U.S. PATENT DOCUMENTS

| | | | | |
|---|---|---|---|---|
| 5,413,477 A | * | 5/1995 | Moreland | F23C 6/045 431/116 |
| 5,688,115 A | * | 11/1997 | Johnson | F23C 6/047 431/115 |
| 5,714,113 A | * | 2/1998 | Gitman | C21B 5/003 266/182 |
| 6,126,438 A | | 10/2000 | Joshi et al. | |

(Continued)

*Primary Examiner* — Avinash A Savani
(74) *Attorney, Agent, or Firm* — Joshua L. Cohen (57) ABSTRACT

A burner, particularly Low-NOx-burner, the method for generating a flame by combustion of a fuel, having a tile surrounding an opening of the tile extending along a burner axis, the tile further having a front side and a rear side facing away from the front side, wherein the rear side comprises an air inlet connected to the opening for feeding air into the opening, and wherein the front side having a discharge outlet connected to the opening for discharging a flame generated by the burner into a surrounding area, and wherein the tile further having an inside facing the opening as well as an outside facing away from the opening. The burner further has at least one oxygen lance extending along the burner axis in a first recess of the tile.

12 Claims, 5 Drawing Sheets

(56) References Cited

U.S. PATENT DOCUMENTS 6,540,508 B1 4/2003 Simpson et al.
2001/0034001 A1 10/2001 Poe et al.

\* cited by examiner

LOW-NO$_x$-BURNER

CROSS-REFERENCE TO RELATED APPLICATIONS

This application claims priority under 35 USC § 119 to International Patent Application No. PCT/EP2015/001656 filed on Aug. 11, 2015 which claims priority from European Patent Application EP 14003024.8 filed on Sep. 2, 2014.

BACKGROUND OF THE INVENTION

The invention relates to a burner for generating a flame by combustion of a fuel, comprising: a tile surrounding an opening of the tile extending along a burner axis, the tile further comprising a front side and a rear side facing away from the front side, wherein the rear side comprises an air inlet connected to said opening for feeding air into said opening, and wherein said front side comprises a discharge outlet connected to said opening for discharging a flame generated by the burner into a surrounding area, and wherein the tile further comprises an inside facing said opening as well as an outside facing away from said opening, the burner further comprising at least one oxygen lance extending along the burner axis in a first recess of said tile, the at least one oxygen lance having an ejection nozzle at an end region of the at least one oxygen lance for ejecting oxygen, characterized in that the first recess for receiving the at least one oxygen lance is formed as a slot formed in the outside of the tile as well as to a method for generating a flame using such a burner.

Such a burner, particularly a Low-NO$_X$-burner, for generating a flame by combustion of a fuel usually comprises a first (e.g. circumferentially extending) refractory tile surrounding an e.g. central opening of the tile, which opening extends along a burner axis, wherein the tile further comprises a front side and a rear side that faces away from said front side, and wherein the rear side comprises an air inlet in flow connection to said opening for feeding air into said opening, and wherein said front side comprises a discharge outlet being in flow connection to said opening for discharging a flame generated by the burner into an ambient surrounding, particularly into a firebox (e.g. of a furnace). Further, the tile comprises an inside facing said opening as well as an outside facing away from said opening/inside.

These burners are for instance used in the oil industry and are e.g. designed according to API RP535 ("Burners for Fired Heaters in General Refinery Services", API recommended practice 535, second edition, January 2006). Particularly, these Low-NO$_x$-burners are either fuel or air staged to manage the peak flame temperature reducing the thermal NO$_x$.

The generation of nitrogen oxides (NO$_x$) can have different origins in the combustion process conducted in a burner of the afore-mentioned kind.

At first, NO$_x$ may be produced from N$_2$ in the so-called prompt or immediate conversion wherein NO$_x$ is produced from N$_2$ within the early stages of the combustion process through a hydrocarbon radical-mechanism, i.e., N$_2$ reacts with radicals such as C, CH, and CH$_2$ fragments derived from the fuel. In the early stages of combustion this results in the formation of fixed species of Nitrogen such as NH, HCN, H$_2$CN and cyano (CN—) radicals which may oxidize to NO.

Further, in the so-called thermal conversion being the temperature dependent oxidation of N$_2$ to NO$_x$, which is favored by high temperatures, the following reactions producing NO$_x$ may occur according to the extended Zeldovich mechanism:

$$N_2+O \rightarrow NO+N$$

$$N+O_2 \rightarrow NO+O, \text{ and}$$

$$N+OH \rightarrow NO+H.$$

Finally, also a so-called fuel bound nitrogen conversion occurs, where nitrogen compounds within the fuel are converted to NO$_x$. Here, during combustion, nitrogen bound in the fuel may be released as a free radical and may ultimately form N$_2$ or NO.

Thus, the thermal NOx production is limited by reducing the flame temperature. This will reduce the NO$_x$ formed, since the corresponding reactions are favored by high temperatures. Fuel NOx is a function of fuel composition. The higher the chemically bound nitrogen in the fuel, the higher the NO$_x$ emissions might be. Finally, prompt NO$_x$ usually only produces a small amount of the generated NO$_x$, which however may be a significant portion of the total NO$_x$ when a low-NO$_x$-burner is employed that reduces the total NO$_x$.

Based on this prior art, the problem underlying the present invention is to provide for an improved burner that is capable of producing less NO$_x$ and a corresponding method for generating a flame using such a burner.

SUMMARY OF THE INVENTION

This problem is solved by a burner for generating a flame by combustion of a fuel, comprising: a tile surrounding an opening of the tile extending along a burner axis, the tile further comprising a front side and a rear side facing away from the front side, wherein the rear side comprises an air inlet connected to said opening for feeding air into said opening, and wherein said front side comprises a discharge outlet connected to said opening for discharging a flame generated by the burner into a surrounding area, and wherein the tile further comprises an inside facing said opening as well as an outside facing away from said opening, the burner further comprising at least one oxygen lance extending along the burner axis in a first recess of said tile, the at least one oxygen lance having an ejection nozzle at an end region of the at least one oxygen lance for ejecting oxygen, characterized in that the first recess for receiving the at least one oxygen lance is formed as a slot formed in the outside of the tile. Preferred embodiments are stated in the sub claims.

The burner further comprises at least one oxygen lance extending along said burner axis in a separate first recess of the tile, wherein the at least one oxygen lance has an ejection nozzle at an end region of the at least one oxygen lance designed for ejecting oxygen, particularly pure oxygen or oxygen enriched air, particularly such that said oxygen is at first ejected into a colder flue gas region surrounding the relatively hotter flame generated by the burner. The first recess for receiving the at least one oxygen lance is formed as a slot formed in the tile on the outside of the tile. Particularly the slot is an open slot, i.e., formed as a groove. Further, the first recess/slot particularly extends parallel to the burner axis.

Particularly, the at least one oxygen lance is connected to an oxygen source so that pure oxygen or oxygen enriched air can flow from said source into the oxygen lance for ejecting the oxygen via the oxygen lance. Particularly, the burner is designed to eject said oxygen via the lance with a speed in the range of 150 m/s to 400 m/s, particularly 200 m/s to 400 m/s. Said oxygen is injected at a pressure in a range between 0.8 barg and 8.0 barg preferably between 2.0 barg and 6.0 barg.

Advantageously, the at least one oxygen lance allows for ejecting oxygen adjacent to the generated flame so as to allow for an enhancing of the recirculation of the flue gas back into the flame, which flue gas is generated by the combustion of the fuel with the oxygen in the primary air. Here, according to the invention, the flue gas recirculation is particularly enhanced due to the fact that the ejection of oxygen according to the invention generates an underpressure adjacent the at least one oxygen lance which causes flue gases in the fire box/ambience of the burner to recirculate into the flame of the burner which reduces the $NO_x$ content in the flue gas due to the fact that the inert flue gas cools the flame and also reduces the partial pressure of oxygen O.

Particularly, the burner is configured to eject oxygen via the at least one oxygen lance with a flow rate that is less than equal to or larger than the oxygen excess flow rate in the flue gas into which the oxygen is ejected via the at least one oxygen lance, so as to yield a stoichiometric or sub stoichiometric combustion in said opening of the tile. Usually, the starting point is the air only mode. The burner is operated with excess of air corresponding to a excess of oxygen. It is a common practice to operate a furnace or boiler with some oxygen in the flue gas, normally 3% $O_2$ to the stack. The excess oxygen in a staged air burner is normally supplied by the secondary air.

According to a preferred embodiment of the present invention, the at least one oxygen lance is mounted such that the position of its ejection nozzle along the burner axis is adjustable, particularly between an uppermost position and a lowermost position. Particularly, there is a zero-position of said nozzle in between the uppermost and the lowermost position, wherein in said zero-position, the nozzle of the at least one oxygen lance particularly resides in a plane spanned by said front side of the tile. Accordingly, in the uppermost position, the ejection nozzle of the at least one oxygen lance protrudes beyond said plane (e.g. in the direction of the injection of the reacting media) along the burner axis, whereas in the lowermost position the ejection nozzle is particularly positioned in front of said plane along the burner axis and does not protrude past said plane along the burner axis. Particularly, the adjustment range is ±50 mm with respect to said zero-position, i.e., in the uppermost position as well as in the lowermost position, the nozzle is particularly 50 mm spaced apart from said plane along the burner axis.

According to a further preferred embodiment of the present invention, the nozzle of the at least one oxygen lance is designed to eject oxygen, particularly in the form of a jet, under an ejection angle with respect to a centerline of the at least one oxygen lance, wherein particularly said ejection angle ranges between −30° and 30° with respect to said centerline. An axis of the jet along which the jet extends and which encloses said angle with said centerline can be inclined towards the burner, so as to eject oxygen into the flame or closer to the flame. Further, said axis of the jet may be inclined away from the burner/flame, so as to inject oxygen primarily away from the flame or into a region surrounding the flame (e.g. flue gas region).

According to an embodiment of the present invention the at least one oxygen lance is configured to also eject oxygen such that the generation of an oxygen swirl along the plane of the front side of the tile is promoted. Particularly, the gas lance, depending e.g. on the specific case, can be designed with one or two nozzles. The lances with two (or more nozzles are particularly used when a swirl has to be generated (see also below).

According to an embodiment of the present invention, the at least one oxygen lance comprises at least two nozzles. Wherein a first nozzle ejects oxygen as described above, and wherein the further nozzle is designed to eject oxygen along the periphery of the tile (e.g. in a direction parallel to a respective tangent of the periphery), particularly so as to promote said generation of an oxygen swirl along the plane of the front side of the tile. Particularly, the burner/tile comprises a plurality of these oxygen lances (having e.g. said two nozzles and being e.g. equidistantly distributed along the periphery of the tile) in order to generate said oxygen swirl, in which oxygen flows along the periphery of the tile and along the plane of the front side of the tile.

According to an further embodiment of the invention, the burner comprises a swirling device arranged in the opening of the tile, which swirling device is designed to deflect air that is passed via the swirling device into the opening of the tile such that an air swirl is generated, in which the air flows along the periphery of the tile.

According to an embodiment of the invention, the at least one oxygen lance or said plurality of oxygen lances are configured such that the oxygen swirl generated by the oxygen lance(s) flows in the direction of the air swirl or in the opposite direction.

According to a further preferred embodiment of the present invention, said slot ends in a second recess of the tile formed on the outside of the tile in an upper, circumferentially extending region of the tile, which upper region of the tile delimits said discharge outlet, such that the end region of the at least one oxygen lance protrudes out of said slot into said second recess.

Particularly, said second recess comprises a planar lateral surface, particularly extending parallel to the burner axis, which planar lateral surface particularly merges in a concave bottom surface of the second recess into which said first recess/slot ends.

Thus, particularly, a step is formed on the outside of the tile from which the at least one oxygen lance protrudes out of the first recess/slot in which it is arranged.

Advantageously, the (e.g. concave) bottom surface and the lateral surface of the second recess allow flue gases to recirculate along these surfaces back into the flame generated by the burner which reduces the total $NO_x$ content in the flue gas due to the fact that the inert flue gas cools the flame and reduces the partial pressure of oxygen thus lowering thermal $NO_x$ emissions. Due to said recirculation a diluted steam of oxygen is generated that gets in touch with the fuel. In case there would be no separation between the two streams, the oxygen would "attract" the fuel and then create a hotter zone where $NO_x$ would be generated.

According to a further embodiment of the present system, the tile of the burner is designed to be mounted in a wall of a furnace (e.g. a wall of a firebox of the furnace), such that the slot ends at an inside of said wall, which inside faces an internal space (e.g. firebox) of the furnace, or above said inside of the wall so that the slot extends past said inside into said internal space along the burner axis. Particularly, an edge of the bottom surface is arranged flush with said inside of the wall.

Consequently, another aspect of the present invention is to provide a furnace comprising at least one burner according to the invention, wherein the burner is mounted in said wall as described above.

Thus, particularly, the tile provides a shield designed for screening an air supply provided through said air inlet from an oxygen supply provided through the ejection nozzle of the oxygen lance, so that oxygen ejected by the nozzle of the oxygen lance is at first ejected into a colder flue gas region surrounding the relatively hotter flame and not directly into the flame. This recirculates colder flue gas into the relative hot region of the flame, but the momentum is generated by an oxygen stream. The effect is then double: the colder flue gas lowers the peak flame temperature "spreading" the flame on a wider region, the oxygen content improves the combustion conditions and stabilises the flame.

According to a further preferred embodiment of the present invention, the burner is formed as a staged fuel burner which comprises a primary fuel gas lance comprising an ejection nozzle at an end region of the primary fuel gas lance, which ejection nozzle of the primary fuel gas lance is designed to eject a primary fuel gas (e.g. natural gas, refinery fuel gas, syngas, hydrogen, etc.) for generating said flame when the ejected primary fuel gas is combusted. Particularly, the ejection nozzle of the primary fuel gas lance is arranged in said opening of the tile and surrounded by the tile. Further, particularly, the burner comprises a number of secondary fuel gas lances each having an ejection nozzle at an end region of the respective secondary fuel gas lance, which ejection nozzles of the secondary fuel gas lances are arranged along the front side of the tile and are designed to eject a secondary fuel gas (e.g. a stream of the same fuel gas as described above) downstream of the tile for generating said flame when the ejected secondary fuel gas is combusted.

Particularly, the burner comprises a number of oxygen lances in the range between one oxygen lance and said number of secondary fuel gas lances. Generally, in case the burner according to the invention comprises several oxygen lances, each oxygen lance is arranged in its own associated first recess/slot and may protrude into an associated second recess, which may be formed as described above.

Further, the staged fuel burner may comprise said swirling device described above, which may surround the primary fuel gas lance, and which is designed for deflecting air passed into the opening of the tile such that an air swirl is generated (see above).

According to an embodiment of the staged fuel burner, the oxygen lances are configured to generate an oxygen swirl of the ejected oxygen, wherein particularly the oxygen swirl has the same direction as the air swirl or an opposite direction (see also above). Particularly, in this respect, swirling the oxygen in the same direction as the air can be beneficial to the flame stability; against it can increase turbulence, e.g. the mixing effect, so that burning of the fuel is enhanced. Particularly, this can be an advantage with fuels that can produce PAH (precursors of the PM10 and PM2.5) or sensible amount of CO.

Further, it is to be noted that said oxygen lances that are configured to generate an oxygen swirl of the ejected oxygen as described above may also be used in the case of staged air burners (see below) and in general also "high $NO_x$" burners (with or without swirling device) i.e., the application of the "swirling" oxygen lance is not be limited to the staged fuel burners. Particularly, air staged burners and in general also "high NOx" burners can be retrofitted with such oxygen lances.

According to an alternative preferred embodiment of the present invention, the burner is formed as an air staged burner, wherein said tile is an inner tile of the burner, and wherein said air inlet is a primary air inlet. Particularly, the burner further comprises an outer tile surrounding an (e.g. central) opening of the outer tile extending along the burner axis, which outer tile is particularly coaxially arranged with respect to said inner tile. The outer tile may surround the inner tile, but may also be arranged offset with respect to the inner tile along the burner axis. Particularly, the outer tile further comprises a front side and a rear side facing away from the front side, wherein the rear side comprises a secondary air inlet being in flow connection to said opening of the outer tile for feeding secondary air into said opening of the outer tile. Further, said front side of the outer tile comprises a discharge outlet being in flow connection to said opening of the outer tile for discharging a flame generated by the burner into a surrounding area, particularly into a firebox (e.g. of a furnace). Further, the outer tile further comprises an inside facing said opening of the outer tile and eventually the inner tile as well as an outside facing away from said opening of the outer tile.

According to another alternative preferred embodiment of the present invention, the burner is formed again as an air staged burner, wherein said tile is now formed as an outer tile of the burner, wherein said air inlet of the outer tile is a secondary air inlet, and wherein the burner further comprises an inner tile surrounding an (e.g. central) opening of the inner tile, which opening of the inner tile extends along the burner axis, the inner tile further comprising a front side and a rear side facing away from the front side, wherein the rear side comprises a primary air inlet being in flow connection to said opening of the inner tile for feeding primary air into said opening of the inner tile. Particularly, said front side of the inner tile comprises a discharge outlet for discharging a flame generated by the burner into an ambient surrounding, particularly into a firebox (e.g. of a furnace), the discharge outlet being in flow connection to the opening of the inner tile, and wherein particularly the inner tile further comprises an inside facing said opening of the inner tile as well as an outside facing away from said opening of the inner tile.

Particularly, in the case of a staged air burner, when the at least one oxygen lance is arranged in the inner tile, the inner tile protrudes past the outer tile (i.e. has a larger height than the outer tile), namely with a region of the inner tile that comprises said planar lateral surface and particularly said bottom surface. Particularly, vice versa, when the at least one oxygen lance is arranged in the outer tile, the outer tile protrudes past the inner tile (i.e. has a larger height than the outer tile), namely with a region of the outer tile that comprises said planar lateral surface and particularly said bottom surface.

Particularly, in the case of an air staged burner, the number of oxygen lances lies in the range between one and four oxygen lances.

Further, in case of an air staged burner comprising an outer and an inner refractory tile as described above, the burner particularly comprises a fuel oil lance comprising an ejection nozzle at an end region of the fuel oil lance, which ejection nozzle of the fuel oil lance is designed to eject a fuel oil for generating said flame when the ejected fuel oil is combusted, wherein the ejection nozzle of the fuel oil lance is arranged in said opening of said inner tile and surrounded by the inner tile. Particularly, said nozzle of the fuel oil lance is surrounded by a central tile of the staged air burner that is surrounded by the inner tile of the staged air burner.

Further, in case of an air staged burner comprising an outer and an inner refractory tile as described above, the burner particularly comprises at least one fuel gas lance comprising an ejection nozzle at an end region of the at least one fuel gas lance, which ejection nozzle of the at least one fuel gas lance is designed to eject a fuel gas for generating said flame when the ejected fuel gas is combusted, wherein the ejection nozzle of the at least one fuel gas lance is arranged in said opening of the inner tile outside the central tile, e.g. in a circumferentially extending gap in between the inner and the central tile of the staged air burner.

Furthermore, the problem according to the invention is solved by a method for generating a flame by combustion of a fuel using a burner, comprising: a tile surrounding an opening of the tilt extending along a burner axis, the tile further comprising a front side and a rear side facing away from the front side, wherein the rear side comprises an air inlet connected to said opening for feeding air into said opening, and wherein said front side comprises a discharge outlet connected to said opening for discharging a flame generated by the burner into a surrounding area, and wherein the tile further comprises an inside facing said opening as well as an outside facing away from said opening, the burner further comprising at least one oxygen lance extending along the burner axis in a first recess of said tile, the at least one oxygen lance having an ejection nozzle at an end region of the at least one oxygen lance for ejecting oxygen, characterized in that the first recess for receiving the at least one oxygen lance is formed as a slot formed in the outside of the tile, wherein a flame is generated by combusting fuel by means of the burner, wherein oxygen is ejected by means of the at least one oxygen lance into the generated flame and/or into a flue gas region adjacent said generated flame, the flue gas being generated by said combustion of said fuel (see also above).

Particularly, in case of a fuel staged burner, a primary fuel gas is ejected by the primary fuel gas lance and combusted and a secondary fuel gas is ejected by the secondary fuel gas lances and combusted so as to generate said flame in a combined fashion.

Alternatively, in case of a staged fuel burner a fuel oil is ejected by the fuel oil lance and combusted, as well as a fuel gas, which is ejected by the fuel gas lances and combusted so as to generate said flame in a combined fashion.

Particularly, the flow rate of oxygen ejected by means of the at least one oxygen lance is equal to or larger than the flow rate of excess oxygen in the flue gas generated upon combustion of said fuel(s), particularly so as to yield a stoichiometric or sub stoichiometric combustion of the fuel in the tile (e.g. fuel staged burner) or in the inner tile by the primary oxidant/air (e.g. staged air burner). Particularly, the invention aims to inject oxygen instead of the secondary air. The oxygen is then particularly injected between the two tiles of the staged air burner, but it can also be injected outside the outer tile.

According to a further preferred embodiment of the method according to the invention, the oxygen is particularly ejected out of the respective oxygen lance at a velocity equal to or below sonic velocity.

All suitable fuels such as fuel oils (e.g. gasoil, heating oil, heavy fuel oil, etc.) and (e.g, primary and/or secondary) fuel gases (e.g. see above) may be used with the burner according to the invention.

The Low-NOx-burner according to this invention particularly provides an enhanced flue gas recirculation and enhanced exploitation of remaining burnable reactants within the flue gas, wherein the tile is implementable into a conventional burner configuration.

Thus, according to another aspect of the present invention merely a tile as described is provided. Advantageously, existing burners could be upgraded with such a tile according to the invention having said oxygen lance arranged e.g. along the outside of the tile. Thus, according to a further aspect of the present invention, a method for retrofitting a conventional tile is provided, wherein said at least one oxygen lance is arranged on the outside of the tile of an existing burner, wherein particularly said first recess (e.g. slot) and particularly said second recess are formed in the (e.g. outside of the) existing tile. Particularly, said at least one oxygen lance is arranged in said first recess/slot and eventually said second recess as described above.

BRIEF DESCRIPTION OF THE DRAWINGS

The above described invention will be explained in detail in consideration of the Figures and the technical field. The Figures show preferred embodiments of the invention. However, the invention is not limited by the drawings. It is shown in FIG. 1: a front view of a conventional refractory burner tile.

DETAILED DESCRIPTION OF THE INVENTION

Figure 1:
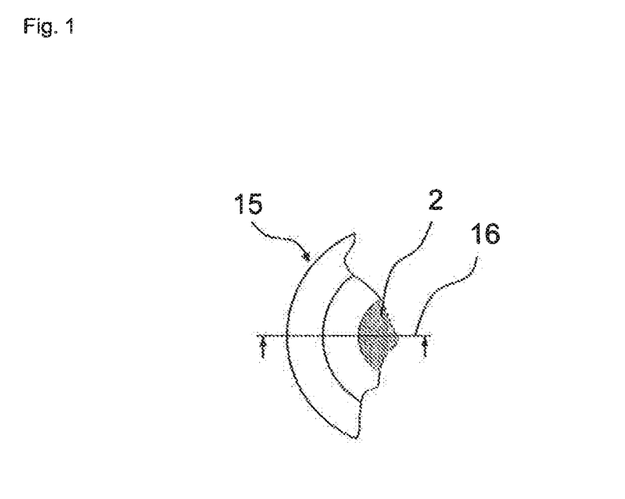

FIG. 1 shows a conventional burner tile 15 out of a refractory material such as Alumina based refractory having a central air inlet 10.

Figure 2:
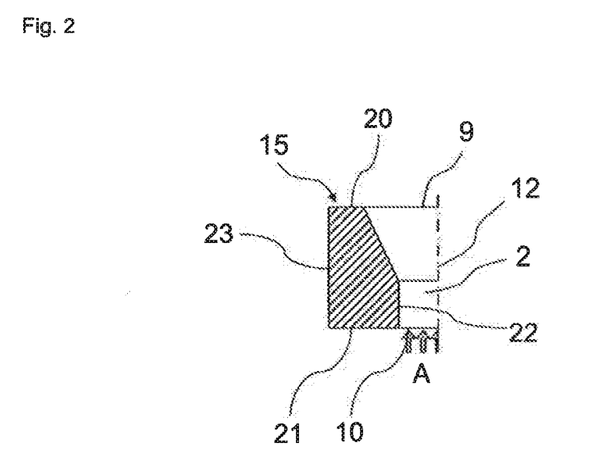
FIG. 2: a longitudinal section through the conventional burner tile according to FIG. 1.

In FIG. 2 a cross sectional view along plane 16 of FIG. 1 of the conventional burner tile 15 is shown. The air inlet 2 is in flow connection to a central opening 2 of the tile 15, which opening 2 extends along a burner axis 12 and ends at a discharge outlet 9 for discharging a flame generated by the burner.

In detail, the tile 15 further comprises a front side 20 and a rear side 21 that faces away from the front side 20 of the tile 15, wherein the rear side 21 delimits said air inlet 10, and wherein the front side 20 delimits said discharge outlet 9. The air inlet 10 is in flow connection to an air source for feeding air into said opening 2 of the tile 15 that is needed for combustion of fuel. The tile 15 further comprises an inside 22 facing said central opening 2 as well as an outside 23 facing away from said opening 2.

Figure 3:
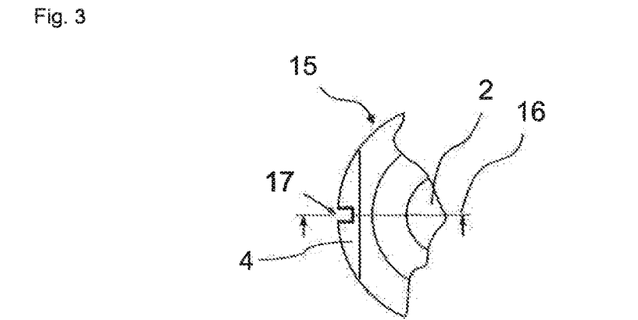
FIG. 3: a front view of a burner tile according to the invention.
Figure 4:
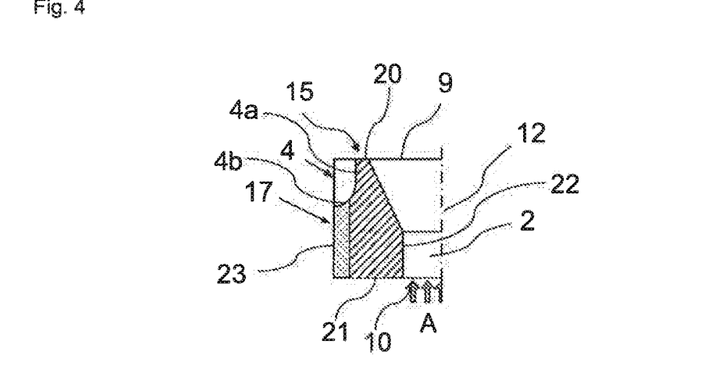
FIG. 4: a longitudinal cross section through the tile of FIG. 3.
Figure 5:
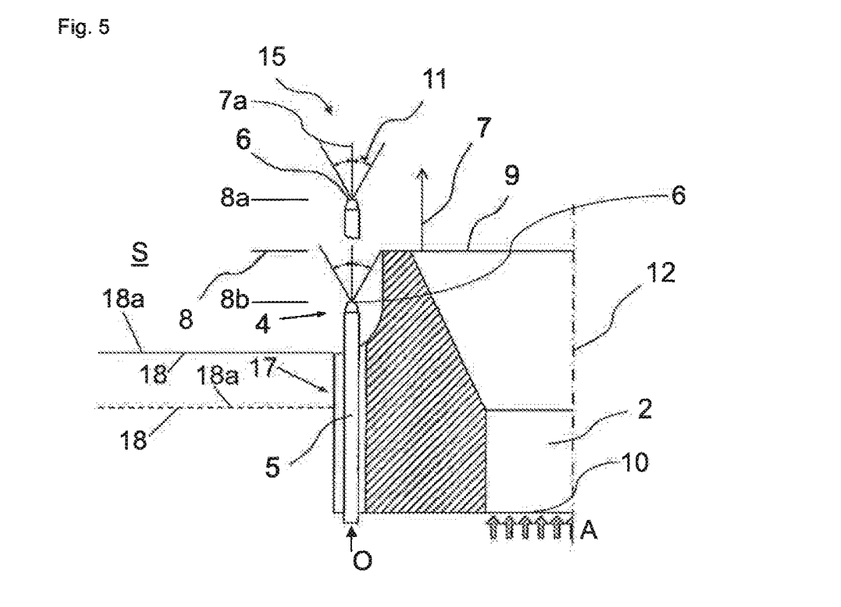
FIG. 5: a detail of the tile according to the invention showing a slideable oxygen lance.

FIGS. 3 to 5 show a tile 15 according to the invention which has a configuration as the conventional tile 15 described above, but further comprises at least one oxygen lance 5 that extends along the burner axis 12 in a first recess 17 of the tile 15. The at least one oxygen lance 5 comprises an ejection nozzle 6 at an end region of the at least one oxygen lance 5 for ejecting pure oxygen O, wherein particularly the at least one oxygen lance 5 is configured to eject the oxygen O into a colder flue gas region 31 surrounding the relatively hotter flame 30 generated by the burner 1 (cf. FIGS. 6 to 7).

Particularly, the first recess 17 for receiving the oxygen lance 5 is formed as a slot or groove in the outside 23 of the tile 15, which slot 17 runs parallel to the burner axis 12. The slot 17 ends in an associated second recess 4 of the tile 15 that is formed in the outside 23 of the tile 15, namely in a circumferentially extending upper region 19 of the tile 15 as shown in FIGS. 4 and 5. Thus, the end region of the oxygen lance 5 protrudes with its ejection nozzle 6 out of the slot 17 into the adjacent second recess 4. Of course, several oxygen lances 5 may be provided in associated slots 17 and second recesses 4.

In detail, the second recess 4 comprises a planar lateral surface 4a that extends parallel to the burner axis 12 and meets a bottom surface 4b of the recess 4 into which said slot 17 ends. Particularly, the bottom surface 4b comprises a concave curvature.

Furthermore, as indicated in FIG. 5 by the solid and dashed lines, the burner tile 15 is designed to be mounted in a wall 18 of a furnace (e.g. of a firebox), such that the slot 17 ends at an inside 18a of said wall (as indicated by the solid line), which inside 18a faces an internal space S of the furnace, or such that the slot 17 ends above said inside 18a of the wall 18 (as indicated by the dashed line) so that the slot 17 extends into said internal space S along the burner axis 12.

The tile 15 (as well as the inner and outer tile 15a, 15b described below) are also particularly made out of a refractory material (e.g. see above).

Furthermore, the oxygen lance 5 is slideable along its direction of longitudinal extension 7 which particularly runs parallel to the burner axis 12 as well as perpendicular to the plane of the discharge outlet 9. Thus, the nozzle 6 of the oxygen lance 5 can be arranged to end within the second flue gas recirculation recess 4, at a zero position 8 in a plane spanned by the front side 20 or said discharge outlet 9 or behind this plane thus extending further into the internal space S (e.g. of a furnace). Here, the ejection angle 11 of the oxygen lance 5 ranges between ±30° with respect to the centerline 7a of the oxygen lance 5. Thus, oxygen O can be ejected towards the flame 30, namely towards the burner axis 12 (positive angle 11) or away from the flame 30/burner axis 12 (negative angle).

Generally, any fuel gas or fuel oil fired burner can be equipped or retrofitted with a tile 15 according to the invention.

Figure 6:
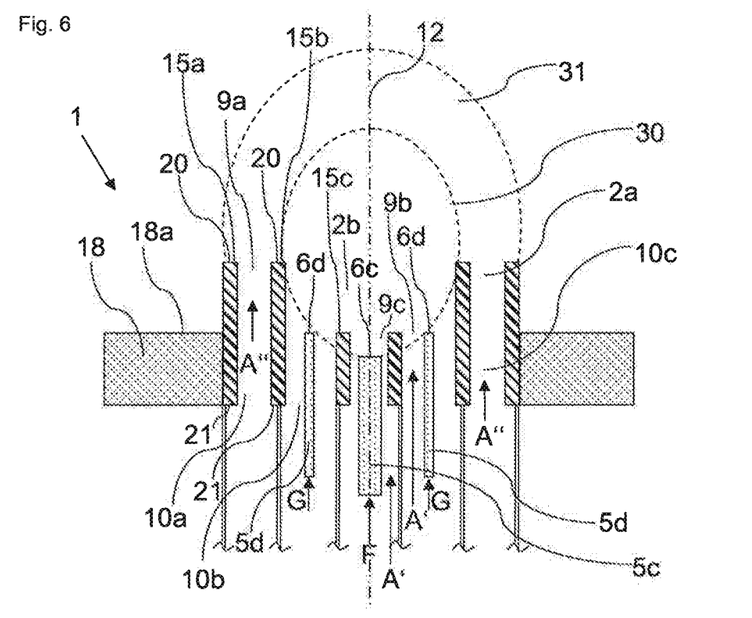
FIGS. 6-8: two embodiments of a staged air burner according to the invention.

FIG. 6 shows a staged air burner 1 according to the invention which may be used especially for oil fired applications.

Such a staged air burner 1 comprises an inner tile 15b that surrounds an opening 2b of the inner tile 15b, wherein the inner tile 15b further comprises, as already described above, a front side 20 delimiting a discharge opening 9b being in flow connection with the opening 2b as well as a primary air inlet 10b at the rear side 21 for feeding primary air A' into the inner tile 15b. The burner 1 further comprises an outer tile 15a which may surround the inner tile 15a. The two tiles 15a, 15b are arranged coaxially with respect to the burner axis 12, wherein the outer tile 15a comprises a larger diameter than the inner tile 15b. The outer tile 15a comprises a central opening 2a as well which extends along the burner axis 12 from a secondary air inlet 10b on a rear side 21 of the outer tile 15a towards a discharge outlet 9a of the outer tile 15a at the front side 20 of the outer tile 15a. Particularly as can be seen from FIG. 6, the inner tile 15b is arranged in the opening 2a of the outer tile 15a so that an e.g. circumferentially extending gap is formed between an outside of the inner tile 15b and an inside of the outer tile 15a that is connected to said secondary air inlet 10a so that secondary air A" can be passed through said gap into the burner 1. The inner tile 15b further comprises an inside facing the opening 2b of the inner tile 15b. Further, the outer tile 15a comprises an outside facing away from the inside of the outer tile 15a.

For the combustion of fuel, the burner 1 according to FIG. 6 further comprises a fuel oil lance 5c coinciding with the burner axis 12 and comprising an ejection nozzle 6c at an end region of the fuel oil lance 5c designed to eject a fuel oil F for generating a flame 30 upon combustion of the fuel oil F. The fuel oil lance 5c can also be a fuel oil gun. In the latter an atomization media (steam or air) is used to spray the liquid into the flame. The ejection nozzle 6c of the fuel oil lance 5c is arranged in an opening of a central tile 15c, which central tile 15c in turn is arranged in the opening 2b of the inner tile 15b and surrounded by the inner tile 15b. Furthermore, the burner 1 comprises fuel gas lances 5d each comprising an ejection nozzle 6d at an end region of the respective fuel gas lance 5d, which ejection nozzles 6d are designed to eject a fuel gas G for generating said flame 30 when the ejected fuel gas G is combusted. The ejection nozzles 6d are e.g. arranged in a circumferential gap between the inner tile 15b and the central tile 15c.

As described above, the staged air burner 1 comprises at least a primary and a secondary air inlet 10a, 10b and eventually a tertiary air inlet via which the total air A', A" (and eventually tertiary air) that is needed for combusting the fuel F,G is injected into the burner 1, particularly according to the following exemplary portions: primary air A' 15% to 25%, secondary air A" 25% to 35% and tertiary air A'" 40% to 55%. In case of primary and secondary air A', A" only, primary air can be around 40%, and secondary air around 60%, for instance. Other rations are also possible.

All fuel oil F and fuel gas G is injected via the fuel oil and gas lances 5c, 5d into a primary combustion zone of the flame 30 with a portion of the total air (e.g. see above). Due to lack of air in said zone, a portion of the fuel oil and fuel gas F, G does not combust resulting in a lower flame temperature causing a lower thermal $NO_x$ production. Further fuel $NO_x$ is limited due to the fact that fuel oil/gas molecules dissociate under fuel oil/gas rich (reducing) conditions. The fuel oil/gas combustion is at least partially completed in a secondary combustion zone of the flame 30. Further, tertiary air (see above) may be injected via at least one corresponding inlet 10c outside the outer tile 15a into a tertiary combustion zone of the flame 30 in which combustion is completed.

Now, to further reduce $NO_x$ emission in a staged air burner 1 the inner tile and/or the outer tile 15b, 15a are formed like the tile 15 described above in conjunction with FIGS. 3 to 5. This is shown in FIGS. 7 and 8.

Figure 7:
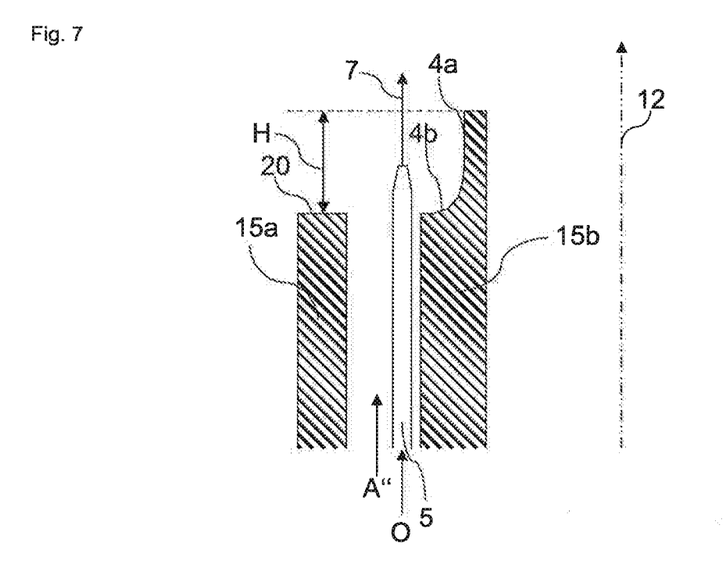

In FIG. 7 the at least one oxygen lance 5 is arranged in a first and a second recess 4, 17 of the inner tile 15b as described with respect to FIGS. 3 to 5 regarding tile 15, wherein the inner tile 15b protrudes in the direction of the burner axis 12 (e.g. direction of longitudinal extension 7) with a portion of height H past the outer tile 15a, which portion of the inner tile 15b comprises said planar lateral surface 4a and particularly bottom surface 4b.

Figure 8:
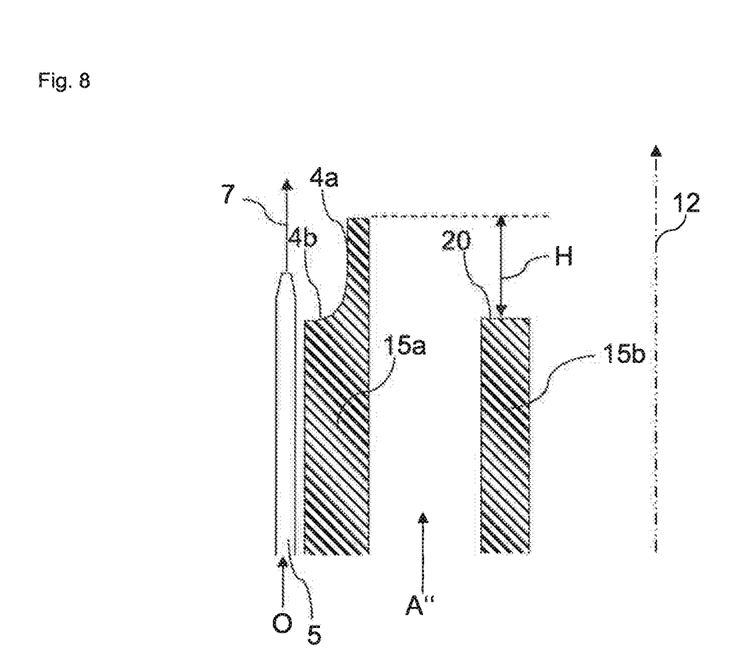

Alternatively, in FIG. 8 the at least one oxygen lance 5 is arranged in a first and a second recess 4, 17 of the outer tile 15a as described with respect to FIGS. 3 to 5 regarding tile 15, wherein the outer tile 15a protrudes in the direction of the burner axis 12 (e.g. direction of longitudinal extension 7) with a portion of height H past the inner tile 15b, which portion of the outer tile 15a comprises said planar lateral surface 4a and particularly bottom surface 4b.

Due to the injection of oxygen O via the oxygen lances 5, particularly into a relatively colder flue gas region 31 containing the relatively colder flue gas, which region 31 surrounds the flame 30, particularly using the ejection angle, oxygen rate and ejection speed described above, the recirculation of flue gases is enhanced along the bottom surface 4b and lateral surface of the second flue gas recirculation recess 4 into the flame 30 yielding a further reduction of $NO_x$ due to the fact that the inert flue gas cools the flame 30 and reduces the partial pressure of oxygen O.

Figure 9:
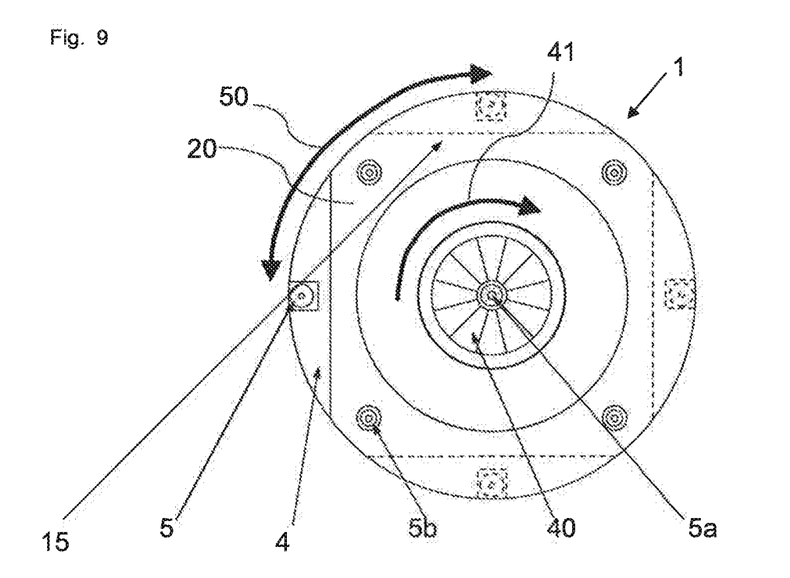
FIGS. 9-10 a staged fuel burner according to the invention.
Figure 10:
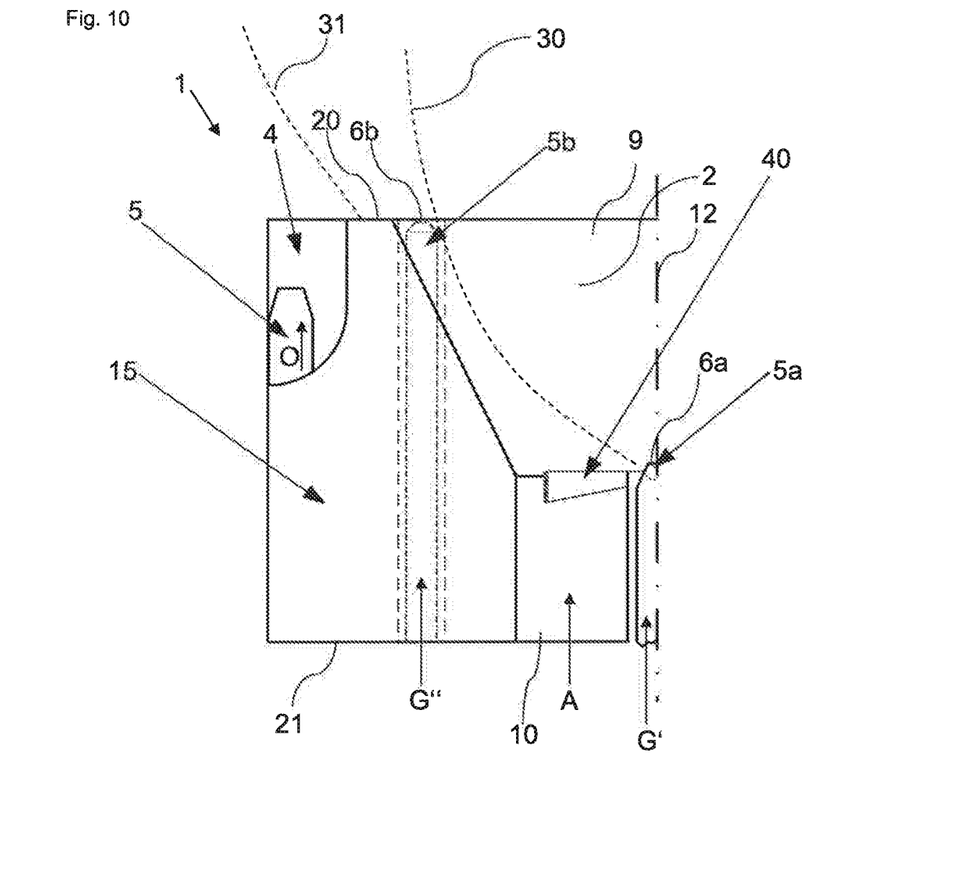

Further, FIGS. 9 and 10 show a burner 1 according to the invention in the form of a staged fuel burner 1.

Here, only a single tile 15 is present which is configured as described in conjunction with FIGS. 3 to 5 above. The burner 1 shown in FIGS. 9 and 10 further comprises a primary fuel gas lance 5a that coincides with the burner axis 12 and comprises an ejection nozzle 6a at an end region of the primary fuel gas lance 5a, wherein said nozzle 6a is designed to eject a primary fuel gas G' for generating a flame 30 when the ejected primary fuel gas G' is combusted. The ejection nozzle 6a of the primary fuel gas lance 5a is arranged in the opening 2 of the tile 15 and surrounded by the tile 15. Furthermore, the burner 1 comprises a number of secondary fuel gas lances 5b (e.g. four such lances 5b) each having an ejection nozzle 6b at an end region of the respective secondary fuel gas lance 5b. The secondary fuel gas lances 5b may be arranged in corresponding apertures of the tile 15 so that the ejection nozzles 6b of the secondary fuel gas lances 5b are arranged along the front side 20 of the tile 15 for ejecting a secondary fuel gas G" downstream the tile 15 for generating said flame 30 when the ejected secondary fuel gas G" is corn busted.

In such a staged fuel burner 1 the air A enters the primary combustion zone of the flame 30 via the air inlet 10 of the tile 15. Particularly, the air A is then passed through a swirling device 40 which deflects the air A so as to generate an air swirl 41 along the plane of the front side 20 of the tile 15 and along the periphery of the tile 15.

Only a portion of the fuel gas, namely the primary fuel gas G', is injected into the primary zone of the flame 30 by means of the central primary fuel gas lance 5a. Combustion of the primary fuel gas G' is thus completed with an overabundance of air A in the tile 15. The majority of the fuel gas, namely the secondary fuel gas G", is released in the secondary stage, i.e., via the secondary fuel gas lances 5b outside the opening 2 of the tile 15 and combusted with the remaining air A in a secondary combustion zone of the flame 30.

Particularly, as shown in FIG. 9, the staged fuel burner 1 comprises four oxygen lances 5 arranged equidistantly in the tile 15. These oxygen lances 5 may also be configured to eject oxygen O such that the generation of an oxygen swirl 50 along the plane of the front side 20 of the tile 15 is achieved, which oxygen swirl 50 may have the same direction as the air swirl 41 or the opposite direction.

For this, the oxygen lances 5 may comprises two nozzles. Wherein the nozzle 6 described above ejects oxygen as described above with respect to FIG. 5, and wherein the further nozzle is designed to eject oxygen along the periphery of the tile (e.g. in a direction parallel to a respective tangent of the periphery), so that said oxygen swirl 50 is created.

Usually 20% to 40% of the total fuel (corresponding to the primary fuel gas G') is mixed with 100% of the total air A. The excess oxygen from the primary zone provides the oxygen necessary to complete the combustion of the remaining fuel gas (secondary fuel gas G"). This yields a relatively low peak flame temperature and therefore a reduced emission of thermal $NO_x$.

In order to further reduce $NO_x$ emission according to the invention, the tile 15 of the burner 1 shown in FIGS. 9 and 10 is configured as described in conjunction with FIGS. 3 to 5, so that oxygen O can be injected via the oxygen lances 5, particularly into a relatively colder flue gas region 31 containing the relatively colder flue gas, which region 31 surrounds the hotter flame 30, particularly using the ejection angle, oxygen rate and ejection speed described above. As already described, this enhances recirculation of flue gases along the bottom surface 4b and lateral surface 4a of the second flue gas recirculation recess 4 into the flame 30 yielding a further reduction of $NO_x$ due to the fact that the inert flue gas cools the flame 30 and reduces the partial pressure of oxygen O (see above).

In summary the invention allows to retrofit existing burners; a modification of existing furnace structures is not necessary. Further, the invention is applicable to all kind of furnace set-ups, including natural draft systems.

The invention allows extended operating range of the furnace normally limited by the available draft in order to keep the firing box in slight negative pressure. The draft in the firing box is generated by the stack effect or by an induced draft fan. When the maximum pressure at the furnace soil is reached, then more fuel cannot be burned in the system. The invention allows higher firing rate into a given process furnaces (above the limit due to the draft limitation) without modifications to the fuel gas extraction system and without increasing the emissions. This means the invention will allows extend the potential of the existing asset, still operating under safe conditions.

REFERENCE NUMERALS

| | |
|---|---|
| 1 | Burner |
| 2, 2a, 2b | Opening |
| 3 | Tertiary air inlets |
| 4 | Second Recess |
| 4a | Planar lateral surface |
| 4b | Bottom surface |
| 5 | Oxygen lance |
| 5a | Primary fuel gas lance |
| 5b | Secondary fuel gas lance |
| 5c | Fuel oil lance |
| 5d | Fuel gas lance |
| 6, 6a, 6b, 6c, 6d | Ejection nozzle |
| 7 | direction of longitudinal extension |
| 7a | Centerline |
| 8 | zero-position |
| 8a | Uppermost position |
| 8b | Lowermost position |
| 9, 9a, 9b, 9c | Discharge outlet |
| 10 | Air inlet |
| 10a | Secondary air inlet |
| 10b | Primary air inlet |
| 10c | Tertiary air inlet |
| 11 | ejection angle |
| 12 | Burner axis |
| 14 | Refractory burner Tile |
| 15 | conventional refractory burner tile |
| 15a | Outer refractory burner tile |
| 15b | Inner refractory burner tile |
| 15c | Central tile |
| 16 | sectional plane |
| 17 | First recess or slot for oxygen lance |
| 18 | Wall of furnace |
| 19 | Upper region of tile |
| 20 | Front side |
| 21 | Rear side |
| 22 | Inside |
| 23 | Outside |
| 30 | Flame |

-continued

| | |
|---|---|
| 31 | Flue gas region |
| 40 | Swirling device |
| 41, 50 | Swirl |
| F | Fuel oil |
| G | Fuel gas |
| G' | Primary fuel gas |
| G" | Secondary fuel gas |
| O | Oxygen |
| A | Air |
| A' | Primary air |
| A" | Secondary air |
| H | height |

What we claim is:

1. A burner for generating a flame by combustion of a fuel, comprising: a tile surrounding an opening of the tile extending along a burner axis, the tile further comprising a front side and a rear side facing away from the front side, wherein the rear side comprises an air inlet connected to said opening for feeding air into said opening, and wherein said front side comprises a discharge outlet connected to said opening for discharging a flame generated by the burner into a surrounding area, and wherein the tile further comprises an inside facing said opening as well as an outside facing away from said opening, the burner further comprising at least one oxygen lance extending along the burner axis in a first recess of said tile, the at least one oxygen lance having an ejection nozzle at an end region of the at least one oxygen lance for ejecting oxygen, characterized in that
the first recess for receiving the at least one oxygen lance is formed as a slot in the outside of the tile, and
the at least one oxygen lance is mounted such that the position of the ejection nozzle along the burner axis is adjustable, between an uppermost position and a lowermost position, via a zero-position in between the uppermost position and the lowermost position, wherein in said zero-position the ejection nozzle resides in a plane spanned by said front side of the tile, and wherein in the uppermost position the ejection nozzle protrudes beyond said plane along the burner axis, and wherein in the lowermost position the ejection nozzle is positioned in front of said plane along the burner axis and does not protrude past said plane along the burner axis.

2. The burner according to claim 1, characterized in that the ejection nozzle is designed to eject the oxygen under an ejection angle with respect to a centerline of the at least one oxygen lance, wherein said ejection angle ranges between −30° and 30° with respect to said centerline.

3. The burner according to claim 1, characterized in that said slot ends in a second recess of the tile formed in the outside of the tile in an upper region of the tile, said upper region of the tile delimits said discharge outlet, such that the end region of the at least one oxygen lance protrudes out of said slot into said second recess.

4. The burner according to claim 3, characterized in that said second recess comprises a planar lateral surface extending parallel to the burner axis, said planar lateral surface merges in a bottom surface of the recess into which said slot ends, said bottom surface comprising a concave curvature.

5. The burner according to claim 1, characterized in that the tile of the burner is designed to be mounted in a wall of a furnace, such that the slot ends at an inside of said wall, and said inside faces an internal space of the furnace, or above said inside of the wall so that the slot extends past said inside into said internal space along the burner axis.

6. The burner according to claim 1, characterized in that said tile is an outer tile, wherein said air inlet is a secondary air inlet of the outer tile, and wherein the burner further comprises an inner tile surrounding an opening of the inner tile, said opening of the inner tile extends along the burner axis, the inner tile further comprising a front side and a rear side facing away from the front side, wherein the rear side of the inner tile comprises a primary air inlet connected to said opening of the inner tile for feeding primary air into said opening of the inner tile, and wherein said front side of the inner tile comprises a discharge outlet for discharging a flame generated by the burner into a surrounding area, the discharge outlet being connected to the opening of the inner tile.

7. The burner according to claim 1, characterized in that the burner comprises a fuel oil lance comprising an ejection nozzle at an end region of the fuel oil lance, said ejection nozzle of the fuel oil lance designed to eject a fuel oil for generating said flame when the ejected fuel oil is combusted, wherein the ejection nozzle of the fuel oil lance is arranged in said opening of said inner tile and surrounded by the inner tile.

8. The burner according to claim 1, characterized in that the burner comprises at least one fuel gas lance comprising an ejection nozzle at an end region of the at least one fuel gas lance, said ejection nozzle of the at least one fuel gas lance designed to eject a fuel gas for generating said flame when the ejected fuel gas is combusted, wherein the ejection nozzle of the at least one fuel gas lance is arranged in said opening of the outer tile outside the opening of the inner tile.

9. A burner for generating a flame by combustion of a fuel, comprising: a tile surrounding an opening of the tile extending along a burner axis, the tile further comprising a front side and a rear side facing away from the front side, wherein the rear side comprises an air inlet connected to said opening for feeding air into said opening, and wherein said front side comprises a discharge outlet connected to said opening for discharging a flame generated by the burner into a surrounding area, and wherein the tile further comprises an inside facing said opening as well as an outside facing away from said opening, the burner further comprising at least one oxygen lance extending along the burner axis in a first recess of said tile, the at least one oxygen lance having an ejection nozzle at an end region of the at least one oxygen lance for ejecting oxygen, characterized in that
the first recess for receiving the at least one oxygen lance is formed as a slot in the outside of the tile, and
the burner further comprises a primary fuel gas lance comprising an ejection nozzle at an end region of the primary fuel gas lance, the ejection nozzle of the primary fuel gas lance designed to eject a primary fuel gas for generating said flame when the ejected primary fuel gas is combusted, wherein the ejection nozzle of the primary fuel gas lance is arranged in said opening of the tile and surrounded by the tile, and wherein the burner further comprises a plurality of secondary fuel gas lances each having an ejection nozzle at an end region of the respective secondary fuel gas lance, said ejection nozzles of the secondary fuel gas lances are arranged along the front side of the tile and eject a secondary fuel gas for generating said flame when the ejected secondary fuel gas is combusted.

10. A burner for generating a flame by combustion of a fuel, comprising: a tile surrounding an opening of the tile extending along a burner axis, the tile further comprising a front side and a rear side facing away from the front side, wherein the rear side comprises an air inlet connected to said opening for feeding air into said opening, and wherein said front side comprises a discharge outlet connected to said opening for discharging a flame generated by the burner into a surrounding area, and wherein the tile further comprises an inside facing said opening as well as an outside facing away from said opening, the burner further comprising at least one oxygen lance extending along the burner axis in a first recess of said tile, the at least one oxygen lance having an ejection nozzle at an end region of the at least one oxygen lance for ejecting oxygen, characterized in that the first recess for receiving the at least one oxygen lance is formed as a slot in the outside of the tile, and the tile is an inner tile of the burner, wherein said air inlet is a primary air inlet of the inner tile, and wherein the burner further comprises an outer tile surrounding an opening of the outer tile extending along the burner axis, wherein the outer tile further comprises a front side and a rear side facing away from the front side, wherein the rear side of the outer tile comprises a secondary air inlet connected to said opening of the outer tile for feeding secondary air into said opening of the outer tile, and wherein said front side of the outer tile comprises a discharge outlet for discharging a flame generated by the burner into a surrounding area, the discharge outlet of the outer tile being connected to the opening of the outer tile.

11. The burner according to claim 10, wherein the burner further comprises a fuel oil lance comprising an ejection nozzle at an end region of the fuel oil lance, said ejection nozzle of the fuel oil lance designed to eject a fuel oil for generating said flame when the ejected fuel oil is combusted, wherein the ejection nozzle of the fuel oil lance is arranged in said opening of said inner tile and surrounded by the inner tile.

12. The burner according to claim 10, wherein the burner further comprises at least one fuel gas lance comprising an ejection nozzle at an end region of the at least one fuel gas lance, said ejection nozzle of the at least one fuel gas lance designed to eject a fuel gas for generating said flame when the ejected fuel gas is combusted, wherein the ejection nozzle of the at least one fuel gas lance is arranged in said opening of the outer tile outside the opening of the inner tile.

* * * * *

UNITED STATES PATENT AND TRADEMARK OFFICE
CERTIFICATE OF CORRECTION

PATENT NO. : 10,352,555 B2  
APPLICATION NO. : 15/505783  
DATED : July 16, 2019  
INVENTOR(S) : Schreiner et al.

Page 1 of 2

It is certified that error appears in the above-identified patent and that said Letters Patent is hereby corrected as shown below:

On the Title Page

In the illustrative figure, delete Fig. 1 and insert Fig. 5 as shown on the attached page.

Signed and Sealed this  
Twentieth Day of April, 2021

Drew Hirshfeld  
*Performing the Functions and Duties of the*  
*Under Secretary of Commerce for Intellectual Property and*  
*Director of the United States Patent and Trademark Office*

(12) United States Patent
Schreiner et al.

(10) Patent No.: US 10,352,555 B2
(45) Date of Patent: Jul. 16, 2019

(54) LOW-NO$_x$-BURNER (71) Applicant: LINDE AKTIENGESELLSCHAFT, München (DE)

(72) Inventors: Bernhard Schreiner, Oberhaching (DE); Lennart Rangmark, Älvsjö (SE); Tomas Ekman, Saltsjö-Boo (SE); Ambrogio Gusberti, Milan (IT)

(73) Assignee: Linde Aktiengesellschaft, Munich (DE)

( * ) Notice: Subject to any disclaimer, the term of this patent is extended or adjusted under 35 U.S.C. 154(b) by 61 days.

(21) Appl. No.: 15/505,783

(22) PCT Filed: Aug. 11, 2015

(86) PCT No.: PCT/EP2015/001656
§ 371 (c)(1),
(2) Date: Feb. 22, 2017

(87) PCT Pub. No.: WO2016/034263
PCT Pub. Date: Mar. 10, 2016

(65) Prior Publication Data
US 2017/0276344 A1 Sep. 28, 2017

(30) Foreign Application Priority Data
Sep. 2, 2014 (EP) .................... 14003024

(51) Int. Cl.
*F23D 14/22* (2006.01)
*F23C 6/04* (2006.01)
*F23L 7/00* (2006.01)

(52) U.S. Cl.
CPC ............. *F23C 6/045* (2013.01); *F23D 14/22* (2013.01); *F23L 7/007* (2013.01); *F23C 2201/301* (2013.01); *F23L 2900/07005* (2013.01); *Y02E 20/344* (2013.01)

(58) Field of Classification Search
CPC .................................. F23C 1/00; F23C 7/00
USPC ............................................................ 431/9
See application file for complete search history.

(56) References Cited

U.S. PATENT DOCUMENTS

| | | | | |
|---|---|---|---|---|
| 5,413,477 A | * | 5/1995 | Moreland | F23C 6/045 431/116 |
| 5,688,115 A | * | 11/1997 | Johnson | F23C 6/047 431/115 |
| 5,714,113 A | * | 2/1998 | Gitman | C21B 5/003 266/182 |
| 6,126,438 A | | 10/2000 | Joshi et al. | |

(Continued)

*Primary Examiner* — Avinash A Savani
(74) *Attorney, Agent, or Firm* — Joshua L. Cohen (57) ABSTRACT

A burner, particularly Low-NOx-burner, the method for generating a flame by combustion of a fuel, having a tile surrounding an opening of the tile extending along a burner axis, the tile further having a front side and a rear side facing away from the front side, wherein the rear side comprises an air inlet connected to the opening for feeding air into the opening, and wherein the front side having a discharge outlet connected to the opening for discharging a flame generated by the burner into a surrounding area, and wherein the tile further having an inside facing the opening as well as an outside facing away from the opening. The burner further has at least one oxygen lance extending along the burner axis in a first recess of the tile.

12 Claims, 5 Drawing Sheets